UNITED STATES PATENT OFFICE.

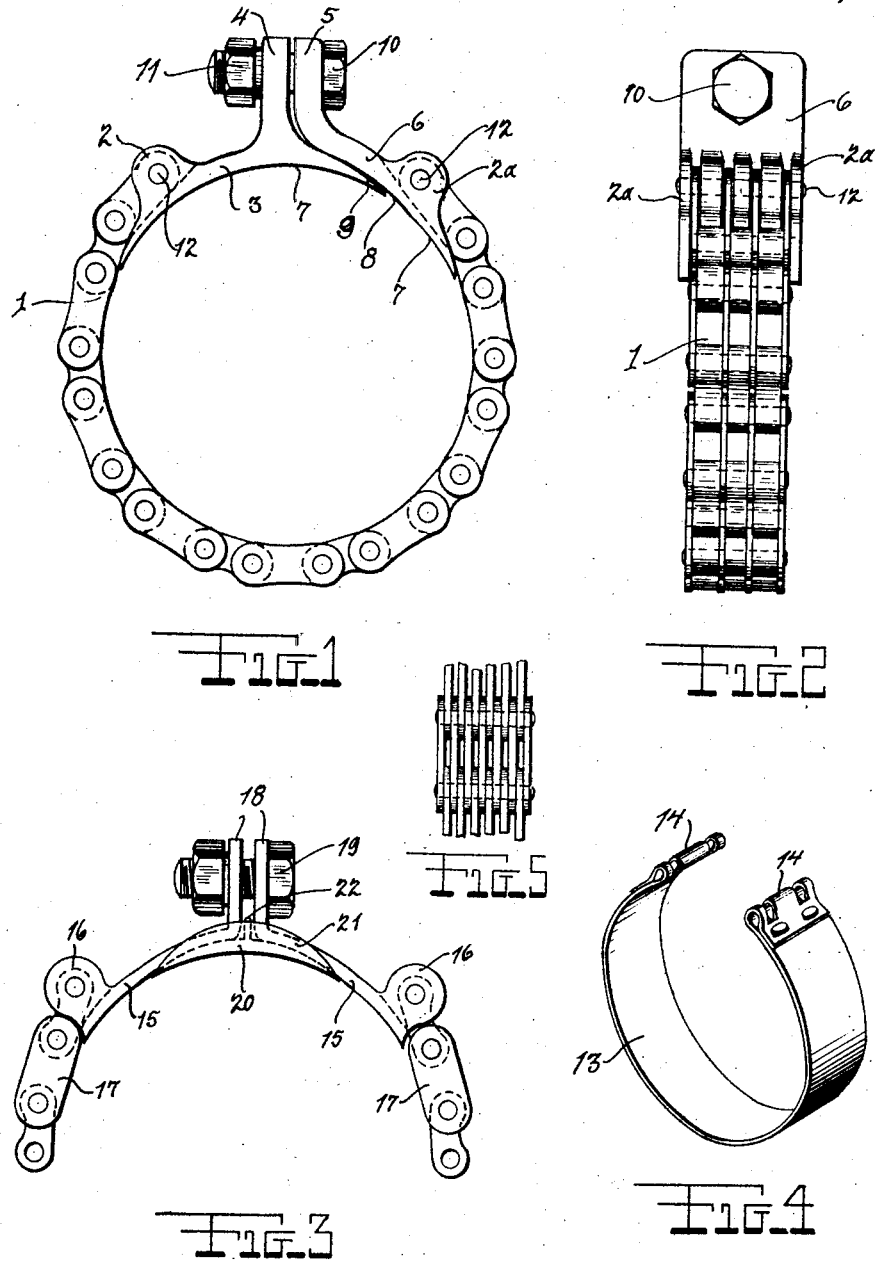

ANTON MATUSCHAK, OF NEW YORK, N. Y.

HOSE CLAMP.

1,412,562.  Specification of Letters Patent.  Patented Apr. 11, 1922.

Application filed June 10, 1921. Serial No. 476,374.

*To all whom it may concern:*

Be it known that I, ANTON MATUSCHAK, a citizen of Austria, residing at New York, in the county of New York and State of New York, have invented certain new and useful Improvements in Hose Clamps, of which the following is a specification.

The main object of this invention is the provision of a flexible hose coupling which, when applied and tightened, will exert an equal pressure in a radial direction at all points of the periphery of the hose under the coupling, so as to prevent any possibility of the hose losing its circular cross-section.

Another object is the provision of such a coupling having means for increasing or diminishing the peripheral length of the coupling so as to adjust the same to hoses of various sizes.

The above and other objects will become apparent in the description below, in which like-named characters of reference refer to like-named parts in the drawings.

Referring briefly to the drawings, Fig. 1 is a side view of the coupling.

Fig. 2 is a front view of the same.

Fig. 3 is a fragmentary side view of a modified form of coupling.

Fig. 4 is a perspective view of the flexible band which may be substituted for the chain shown in the other views.

Fig. 5 is a fragmentary view of my preferred form of chain, in which all of the segments of the links are of the same size.

Referring now in detail to the drawings, the numeral 1 represents the chain constructed of a series of links of any desired form. One end of the chain is attached to ears 2 of a substantially arcuate member 3 having an extended tongue 4. A substantially similar tongue 5, adapted to rest snugly against the tongue 4, is integral with a second substantially arcuate member 6 having ears 2ª similar to the ears 2. The other end of the chain 1 is removably secured to the ears 2ª by means of a pin 12.

The curvature of the entire inner edge of the member 3, indicated at 7, is circular, as is also that portion of the inner edge of the member 6 which is also indicated at 7. The end 9 of the member 3 performs the function of a wedge, being adapted to slide under the member 6 and to contact with that portion of the underside of the member 6 which is indicated at 8. The surface 8 is not necessarily circular, but if made circular, its radius of curvature is greater than that of the surface 7. Eyelets are provided in the tongues 4 and 5 so that a bolt 10 may pass therethrough and tie the tongues together through the aid of a nut 11.

In use, with the bolt 10 removed, the chain is passed about the hose and the tongues 4 and 5 are brought together. Then the bolt is inserted and, with the nut, tightened, at which time the wedge 9 passes between the surface 8 and the surface of the hose. When the wedge has reached the end of the surface 8, the clamp will have been fully tightened, and the surfaces 7 of both members 3 and 6 will be so disposed as to form a single circular surface against the surface of the hose.

It is apparent that the clamp described will exert a radial pressure toward the axis of the hose, of an equal degree at every point on the periphery of the hose under said clamp. In the event that it is desired to use a given clamp of the above construction for various sizes of hose, it is but necessary to add a link to the chain or to remove a link.

As a modification of the form of clamp described, I have shown in Fig. 4 a band 13 of soft, flexible material which may be substituted for the chain 1. The flexibility of this band allows the same to behave substantially in the same manner as the chain.

In the modified form shown in Fig. 3 mutually similar members 15 are attached to the ends of the chain 17 at the ears 16 of the former. Mutually parallel tongues 18 extend from said members and are, as above, adapted to be clamped together by a bolt 19. A separate member 20 having its sides flanged up at 21 so as to provide a guide for the members 15 to prevent them from slipping off the member 20, is used in conjunction with this last-mentioned modification. A neck 22 runs transversely over the base of the member 20, being rigid and equidistant from the ends of the member.

In using this form, the member 20 is placed on the hose and the chain 17 is passed around the hose, the end members 15 being then placed on the member 20 as shown. Then, as the bolt 19 is mounted and tightened, it is apparent that the members 15 will approach each other and will ultimately lie on either side of the neck 22. The curvature of the lower surface of the member 20 is circular, as is also that of the greater portion of the lower surfaces of the members 15. However, in the same manner and for the same reasons as described above for the member 6, the portions of the lower surfaces of the members 15 which are adapted to lie upon the member 20, are of a different curvature or else of circular curvature of a different radius.

I claim:

A hose clamp comprising a plurality of articulated plate links arranged side by side to form a band, said links having concavely curved longitudinal edges, symmetrical connecting elements engaging at the ends of said band, said connecting elements having outwardly turned clamp members arranged in spaced parallel relation, a bolt passing through said members, a concave saddle having raised flanged sides disposed below said connecting elements central of the clamp members, and a raised lug formed with said saddle extending between said clamp members.

In witness whereof I affix my signature.

ANTON MATUSCHAK.